US00RE38731E

(19) United States
(12) Reissued Patent
To

(10) Patent Number: US RE38,731 E
(45) Date of Reissued Patent: May 3, 2005

(54) RING BINDER

(75) Inventor: Chun Yuen To, Kwai Chung (HK)

(73) Assignee: World Wide Stationery Manufacturing Company Limited, Kwai Chung (HK)

(21) Appl. No.: 09/725,788

(22) Filed: Nov. 29, 2000

Related U.S. Patent Documents

Reissue of:
(64) Patent No.: 5,842,807
Issued: Dec. 1, 1998
Appl. No.: 08/707,398
Filed: Sep. 4, 1996

(30) Foreign Application Priority Data

Sep. 4, 1995 (GB) ..... 9517993

(51) Int. Cl.[7] ..... B42F 3/04; B42F 13/20; B42F 3/00

(52) U.S. Cl. ..... 402/36; 402/26; 402/31; 402/37; 402/38; 402/39; 402/40; 402/41; 402/42; 402/70; 402/73; 402/75; 402/80 R; 24/94; 24/95; 24/96; 24/67 R; 24/457; 24/522; 24/703.5; 24/716

(58) Field of Search ..... 402/26, 31, 36, 402/37, 38, 39, 40, 41, 42, 70, 73, 75, 80 R; 24/67 R, 94, 95, 96, 457, 522, 703.5, 716

(56) References Cited

U.S. PATENT DOCUMENTS

| | | | | | |
|---|---|---|---|---|---|
| 324,212 | A | * | 8/1885 | Baker | 24/94 |
| 446,139 | A | * | 2/1891 | Richardson | 24/691 |
| 1,456,036 | A | | 5/1923 | Nissen | |
| 1,709,955 | A | | 4/1929 | Schade | |
| 2,005,573 | A | * | 6/1935 | Watson | 402/40 |
| 2,512,415 | A | * | 6/1950 | Buenger et al. | 402/37 |
| 2,888,934 | A | | 6/1959 | Segal | |
| 3,159,411 | A | | 12/1964 | McKowen | |
| 3,175,847 | A | | 3/1965 | McKowen | |
| 3,809,485 | A | | 5/1974 | Beyer | |
| 3,950,107 | A | | 4/1976 | Seaborn | |
| 4,295,747 | A | | 10/1981 | Errichiello | |
| 4,552,478 | A | * | 11/1985 | Cohen | 402/39 |
| 4,697,945 | A | | 10/1987 | Geiger | |
| 4,722,628 | A | | 2/1988 | Rager | |
| 4,935,998 | A | | 6/1990 | Frazier et al. | |
| 5,035,526 | A | | 7/1991 | Cooper et al. | |
| 5,100,253 | A | | 3/1992 | Cooper | |
| 5,106,223 | A | | 4/1992 | Kraus | |
| 5,158,387 | A | * | 10/1992 | Davies | 402/76 |
| 5,160,209 | A | * | 11/1992 | Schuessler | 402/75 |
| 5,180,247 | A | | 1/1993 | Yu | |
| 5,265,967 | A | | 11/1993 | Han | |
| 5,269,616 | A | | 12/1993 | O'Neill | |
| 5,286,128 | A | | 2/1994 | Gillum | |

(Continued)

FOREIGN PATENT DOCUMENTS

| | | |
|---|---|---|
| DE | 196 02 813 A1 | 8/1996 |
| GB | 954 417 | 4/1964 |
| GB | 1 111 435 | 4/1968 |
| GB | 1 484 908 | 9/1977 |

*Primary Examiner*—Andrea Wellington
*Assistant Examiner*—Mark Henderson
(74) *Attorney, Agent, or Firm*—Senniger Powers

(57) ABSTRACT

A ring binder adapted to be secured to an article by at least one integral rivet, the ring binder comprising a substantially rigid integral upper plate supporting a pair of pivotable lower plates to which a plurality of ring members are mounted, the rivet comprising (1) a barrel that is in direct engagement with the upper plate and (2) a plurality of claws for securing the article, wherein at least 75% of said claws extend away from a longitudinal axis of the barrel. Also disclosed is a rivet adapted to secure a ring binder to an article, the rivet comprising (1) a barrel for engaging the ring binder and (2) a plurality of claws for securing the article, wherein at least a majority of the claws generally extend away from a longitudinal axis of the barrel.

30 Claims, 3 Drawing Sheets

U.S. PATENT DOCUMENTS 5,354,142 A 10/1994 Yu
5,368,407 A 11/1994 Law
5,378,073 A 1/1995 Law
5,393,155 A 2/1995 Ng
5,476,335 A 12/1995 Whaley
5,577,852 A 11/1996 To
5,879,097 A * 3/1999 Cheng ..... 402/26
5,903,958 A * 5/1999 Whaley ..... 24/703.5
D414,802 S * 10/1999 Whaley ..... D19/32
6,007,265 A * 12/1999 Whaley ..... 402/31
6,007,266 A * 12/1999 Cheng et al. ..... 402/36
6,019,538 A * 2/2000 Whaley ..... 402/75
D438,244 S * 2/2001 Whaley ..... D19/32
6,394,686 B1 * 5/2002 Whaley et al. ..... 402/26
2002/0131810 A1 * 9/2002 Whaley et al. ..... 402/70

* cited by examiner

RING BINDER

Matter enclosed in heavy brackets [ ] appears in the original patent but forms no part of this reissue specification; matter printed in italics indicates the additions made by reissue.

This invention relates to a ring binder and, in particular, a ring binder adapted to be secured by at least one rivet to a base member.

Conventionally, a ring binder is securable to a cover by rivets having a head portion engageable with the cover and a tail portion which is deformable, e.g. by punching, to engage a barrel secured to an upper plate of the ring binder.

A disadvantage associated with such a conventional ring binder is that the assembling process is both laborious and prone to error. In the first place, it is necessary to provide the assemblers with rivets properly sized and shaped to fit both the barrels and the corresponding holes in the cover. The assemblers have to secure the ring binder to the cover by first inserting the rivet through the cover, then through the barrel in the ring binder and then to deform the tail of the rivet, e.g. by punching, to engage the upper plate of the ring binder.

It is therefore an object of the present invention to provide a ring binder in which the aforesaid shortcomings are mitigated. It is also a further object of the present invention to provide a rivet to mitigate the aforesaid problems.

According to a first aspect of the present invention, there is provided a ring binder adapted to be secured to a base member by at least one securing means, the ring binder comprising a substantially rigid upper structure supporting a pivotable lower structure to which a plurality of ring members are mounted, the securing means comprising firstly an engagement member for engaging the upper structure and secondly a plurality of securing elements for securing the base member characterized in that at least a majority of the securing elements generally extend away from the longitudinal axis of the engagement member.

Advantageously, at least 75% of the securing elements may generally extend away from the longitudinal axis of the engagement member.

Conveniently, substantially all the securing elements may generally extend away from the longitudinal axis of the engagement member.

Suitably, the securing elements may be positioned substantially equidistant from the longitudinal axis of the engagement member.

The longitudinal axis of the engagement member may advantageously be transverse to the longitudinal axis of the ring binder.

The securing elements may conveniently be deformable to secure the base member.

Each securing element may suitably comprise an arcuate sector.

Advantageously, the securing elements may depend downward from a plate member of the securing means.

Conveniently, the plate member may be adapted to abut against the base member.

Suitably, the plate member may be substantially parallel to the longitudinal axis of the ring binder.

The engagement member may advantageously comprise an upper end deformable to engage the upper structure.

The engagement member may conveniently be substantially upstanding.

The upper structure may suitably comprise a recess with which the upper end of the engagement member is deformable to engage.

Advantageously, the engagement member may be integrally formed with the securing elements.

Conveniently, the engagement member may be integrally formed with the plate.

Suitably, the plate may be integrally formed with the securing elements.

According to a second aspect of the present invention, there is provided a rivet adapted to secure a ring binder to a base member, the rivet comprising an engagement member for engaging the ring binder and a plurality of securing elements for securing the base member characterized in that at least a majority of the securing elements generally extend away from the longitudinal axis of the engagement member.

Advantageously, at least 75% of the securing elements may generally extend away from the longitudinal axis of the engagement member.

Conveniently, substantially all the securing elements may generally extend away from the longitudinal axis of the engagement member.

Suitably, the securing elements may be positioned substantially equidistant from the longitudinal axis of the engagement member.

The longitudinal axis of the engagement member may advantageously be transverse to the longitudinal axis of the ring binder.

The securing elements may conveniently be deformable to secure the base member.

Each securing element may suitably comprise an arcuate sector.

Advantageously, the securing elements may depend downward from a plate member of the securing means.

Conveniently, the plate member may be adapted to abut against the base member.

Suitably, the plate member may be substantially parallel to the longitudinal axis of the ring binder.

The engagement member may advantageously be integrally formed with the securing elements.

The engagement member may conveniently be integrally formed with the plate.

The plate may suitably be integrally formed with the securing elements.

The present invention will now be discussed in further detail and with reference to the accompanying drawings, wherein.

Figure 1:
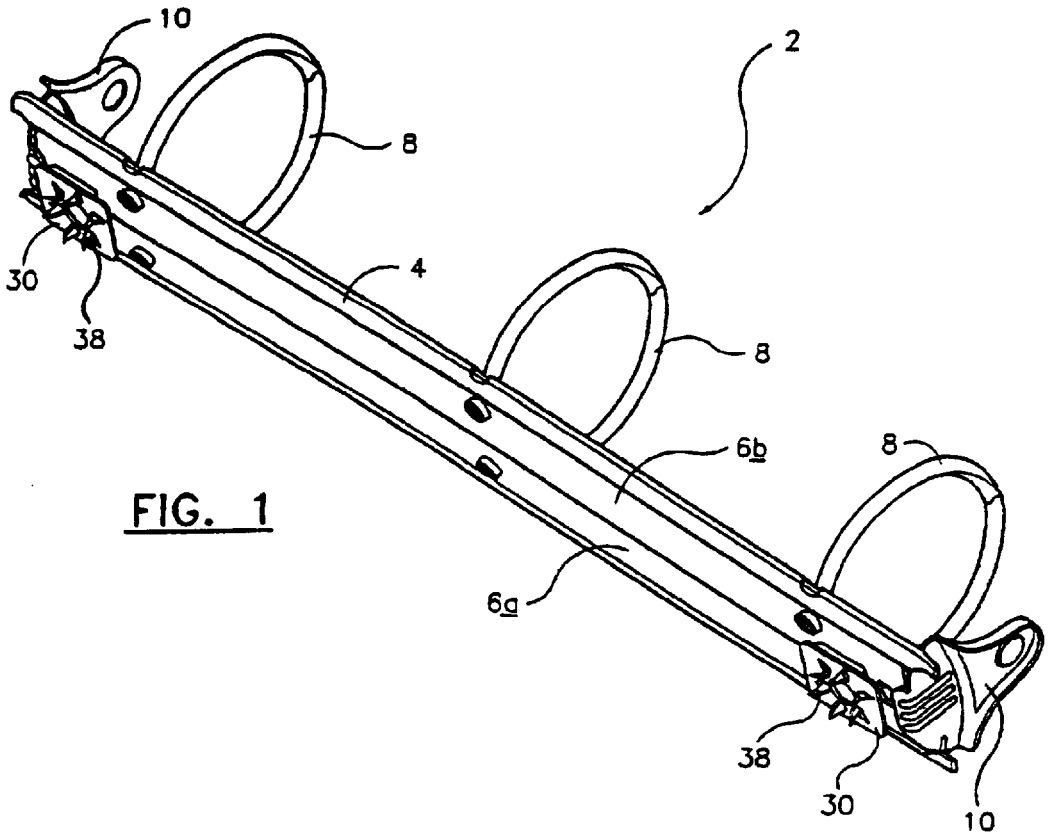
FIG. 1 shows an underside perspective view of a ring binder according to the present invention.
Figure 2:
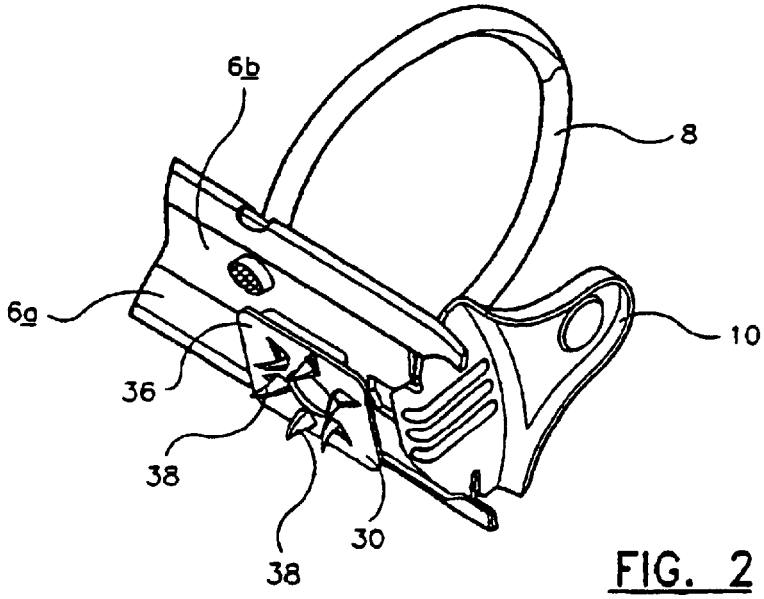
FIG. 2 shows an enlarged partial view of the ring binder shown in FIG. 1.
Figure 4:
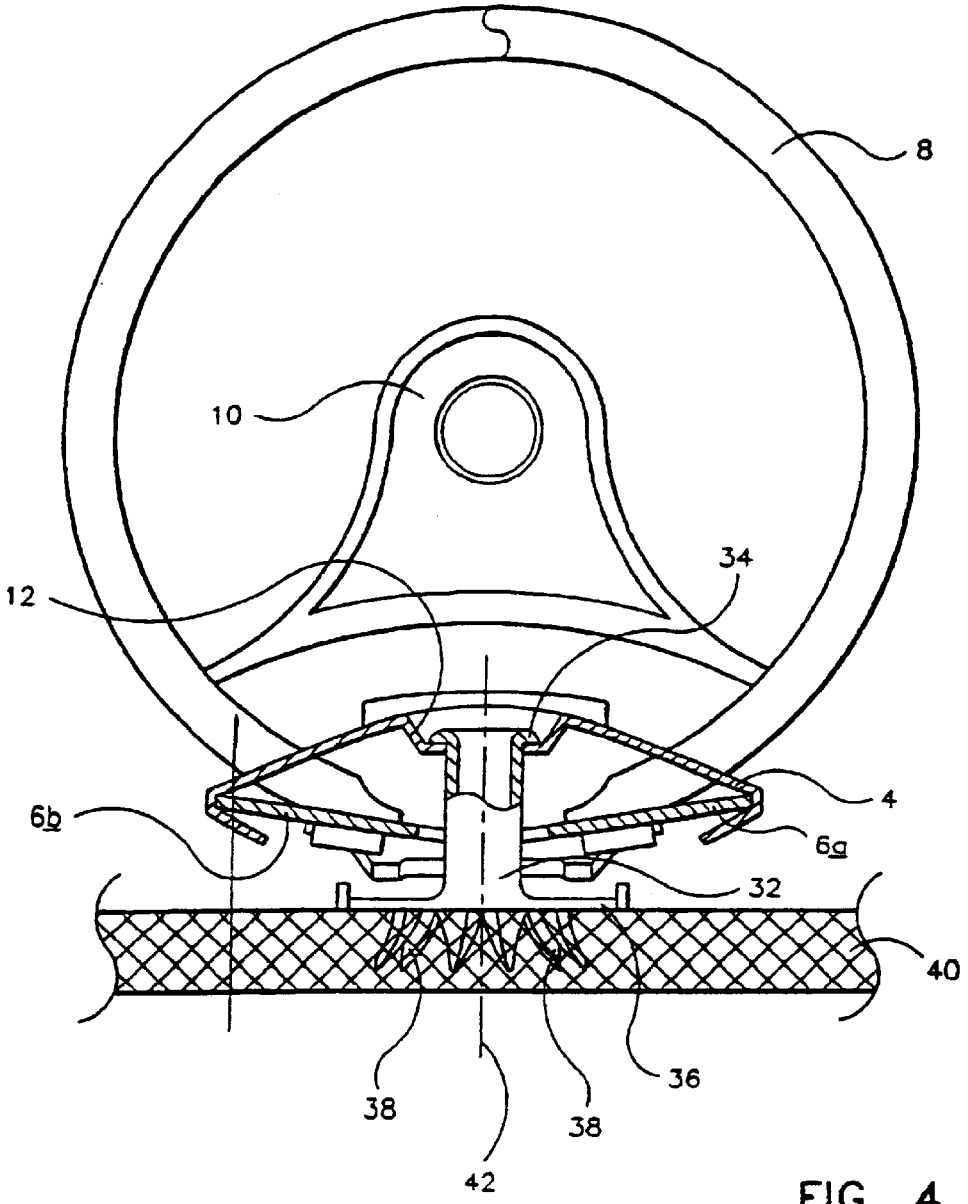
FIG. 4 shows a transverse cross-sectional view of the ring binder shown in FIG. 1.

FIGS. 1, 2 and 4 show a ring binder according to the present invention, generally designated as 2, as comprising a substantially rigid curved upper plate 4 supporting a pair of elongate plates 6*a* and 6*b* pivotally moveable relative to each other. Secured to the elongate plates 6*a* and 6*b* are three ring members 8. At each end of the ring binder 2 is a lever 10 which may be pivoted outwardly, e.g. by a thumb, to act upon the underside of the elongate plates 6*a* and 6*b* and thereby to open the ring members 8 in the conventional manner. Engageable with an open depression 12 near each end of the curved upper plate 4 is a rivet 30.

Figure 3A:
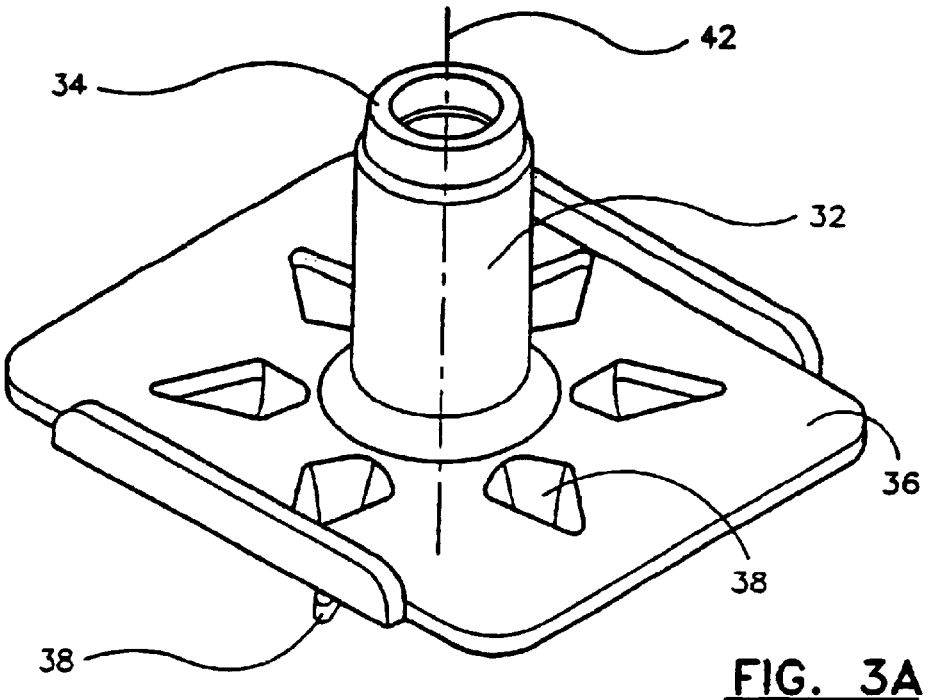
FIGS. 3A and 3B show top perspective and underside perspective views of the rivet shown in FIGS. 1 and 2.
Figure 3B:
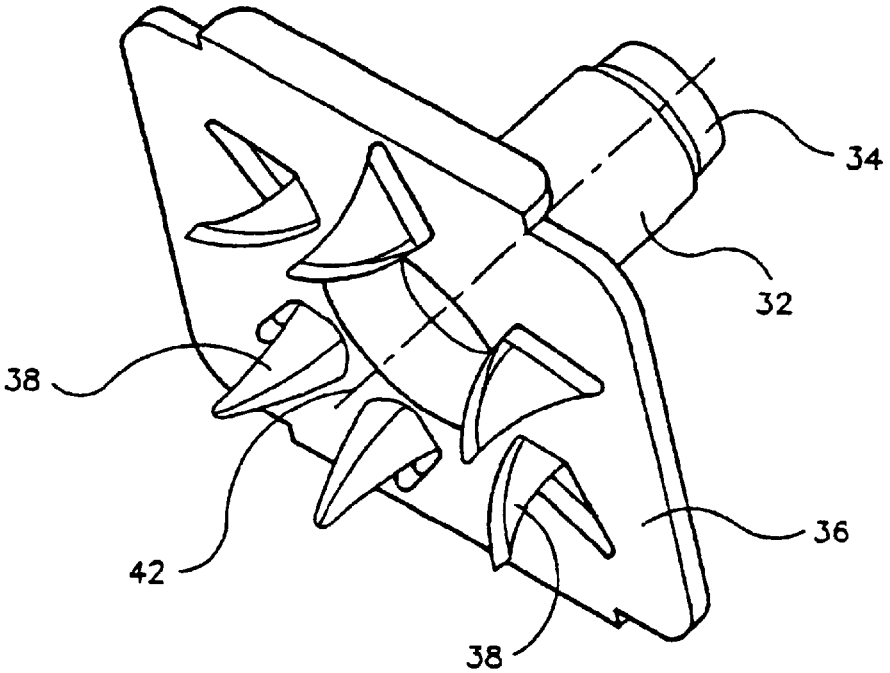

As shown more clearly in FIGS. 3A and 3B, the rivet 30 comprises a cylindrical body 32 having a narrower head 34 which is deformable to engage the depression 12. The rivet 30 has a substantially flat plate 36 with a number of downwardly depending claws 38, which may be deformed to engage a cardboard or plastic (e.g. PVC) cover 40. The claws 38 are formed by being pushed out from the flat plate 36. The claws 38 extend away, and are positioned equidistantly, from the longitudinal axis 42 of the cylindrical body 32. The cylindrical body 32, head 34, flat plate 36 and claws 38 are all integrally formed, so as to enhance the strength of the rivet 30. When assembled, the flat plate 36 abuts against that surface of the cover 40 facing the ring binder 2. Such an arrangement enhances the stability of the rivet 30, hence the ring binder 2, relative to the cover 40.

It should be noted that the above only illustrates examples whereby the present invention may be carried out, and that further modifications and changes may be made to the above example without departing from the spirit of the invention.

I claim:

1. A ring binder adapted to be secured to a base member, the ring binder comprising a substantially rigid integral upper structure;

a pivotable lower structure supported by said upper structure;

a plurality of ring members mounted to said lower structure; and at least one integral securing means for securing said ring binder to said base member, said at least one securing means including an engagement portion in direct engagement with the upper structure for attaching said securing means to said upper structure; and a plurality of securing elements for securing said ring binder to the base member, at least 75% of said elements extending away from a longitudinal axis of the engagement portion.

2. A ring binder according to claim 1 further characterized in that substantially all the securing elements generally extend away from the longitudinal axis of the engagement portion.

3. A ring binder according to claim 1 further characterized in that the securing elements are positioned substantially equidistant from the longitudinal axis of the engagement portion.

4. A ring binder according to claim 1 wherein the ring binder has a longitudinal axis and is further characterized in that the longitudinal axis of the engagement portion is transverse to the longitudinal axis of the ring binder.

5. A ring binder according to claim 1 further characterized in that the securing elements are deformable to secure the base member.

6. A ring binder according to claim 1 further characterized in that each securing element comprises an arcuate sector.

7. A ring binder according to claim 1 further characterized in that the engagement portion [is substantially upstanding] *extends away from the base member*.

8. A ring binder according to claim 7 further characterized in that the upper structure comprises a recess with which [the] *an* upper end of the engagement portion is deformable to engage.

9. A ring binder according to claim 1 further characterized in that the securing elements depend downward from a plate member of the securing means.

10. A ring binder according to claim 9 further characterized in that the plate member is adapted to abut against the base member.

11. A ring binder according to claim 9 wherein the ring binder has a longitudinal axis and is further characterized in that the plate member is substantially parallel to the longitudinal axis of the ring binder.

12. A ring binder according to claims 1, 9, 10 or 11 further characterized in that the engagement portion comprises an upper end [deformably] *deformable* to engage the upper structure.

13. A ring binder according to claim 1 further characterized in that the securing elements are positioned substantially equidistant from the longitudinal axis of the engagement portion;

the securing elements depend downward from a plate member of the securing means, wherein said plate member is adapted to abut against the base member; and the engagement portion comprises an upper end [deformably] *deformable* to engage the upper structure.

14. A ring binder according to claims 9 or 13 further characterized in that the engagement portion is integrally formed with the securing elements.

15. A ring binder according to claims 8 or 13 further characterized in that the engagement [member] *portion* is integrally formed with the plate.

16. A ring binder according to [claims 1 or] *claim* 13 further characterized in that the plate is integrally formed with the securing elements.

17. A ring binder according to claim 13 further characterized in that the engagement [member] *portion* is integrally formed with the securing elements and the plate *member*; and the plate *member* is integrally formed with the securing elements.

*18. A ring binder adapted to be secured to a base member, the ring binder comprising:*

*a substantially rigid integral upper structure;*

*a pivotable lower structure supported by said upper structure;*

*a plurality of ring members mounted to said lower structure; and*

*at least one securing fastener for securing said ring binder to said base member, wherein said at least one securing fastener is integral for enhanced strength, said at least one securing fastener including,*

*an engagement portion in direct engagement with the upper structure for attaching said securing fastener to said upper structure; and*

*a plurality of securing elements for securing said ring binder to the base member, at least 75% of said elements extending away from a longitudinal axis of the engagement portion.*

*19. A ring binder adapted to be secured to a base member, the ring binder comprising:*

*a substantially rigid integral upper structure;*

*a pivotable lower structure supported by said upper structure;*

*a plurality of ring members mounted to said lower structure; and*

*at least one securing fastener for securing said ring binder to said base member, wherein said at least one securing fastener is integral for enhanced strength, said at least one securing fastener including,*

*an engagement portion in direct engagement with the upper structure for attaching said securing fastener to said upper structure, and*

*securing elements for securing said ring binder to the base member, the securing elements each having a free end located at an end of the securing fastener farthest from the engagement portion, at least 75%*

*of said elements extending away from a longitudinal axis of the engagement portion.*

*20. A ring binder as set forth in claim 19 wherein the securing elements all have substantially the same length.*

*21. A ring binder as set forth in claim 19 wherein the free ends of the securing elements are substantially coplanar.*

*22. A ring binder as set forth in claim 19 wherein the engagement portion comprises a generally tubular body having an upper end engaging the upper structure, the securing elements being located remotely from the upper end of the tubular body.*

*23. A ring binder as set forth in claim 22 wherein the tubular body and securing elements are integrally formed.*

*24. A ring binder as set forth in claim 23 wherein the tubular body and securing elements are formed as one piece.*

*25. A ring binder as set forth in claim 24 wherein the securing fastener further comprises a flat plate engageable with the base member, and wherein the securing elements depend from the flat plate.*

*26. A ring binder as set forth in claim 25 wherein the tubular body, the flat plate and the securing elements are integrally formed.*

*27. A ring binder as set forth in claim 26 wherein the tubular body, the flat plate and the securing elements are formed as one piece.*

*28. A ring binder adapted to be secured to a base member, the ring binder comprising:*

*a substantially rigid integral upper structure;*

*a pivotable lower structure supported by said upper structure;*

*a plurality of ring members mounted to said lower structure; and*

*at least one securing fastener for securing said ring binder to said base member, wherein said at least one securing fastener is integral for enhanced strength, said at least one securing fastener including,*

*an engagement portion in direct engagement with the upper structure for attaching said securing fastener to said upper structure, and*

*securing elements for securing said ring binder to the base member, the securing elements each having substantially equal length, at least 75% of said elements extending away from a longitudinal axis of the engagement portion.*

*29. A ring binder adapted to be secured to a base member, the ring binder comprising:*

*a substantially rigid integral upper structure;*

*a pivotable lower structure supported by said upper structure;*

*a plurality of ring members mounted to said lower structure; and*

*at least one securing fastener for securing said ring binder to said base member, wherein said at least one securing fastener is integral for enhanced strength, said at least one securing fastener including,*

*an engagement portion in direct engagement with the upper structure for attaching said securing fastener to said upper structure, and*

*securing elements for securing said ring binder to the base member, the securing elements each having a free end located at an end of the securing fastener, the free ends of the securing elements being substantially coplanar, and at least 75% of said elements extending away from a longitudinal axis of the engagement portion.*

*30. A ring binder adapted to be secured to a base member, the ring binder comprising:*

*a substantially rigid integral upper structure;*

*a pivotable lower structure supported by said upper structure;*

*a plurality of ring members mounted to said lower structure; and*

*at least one integral securing fastener for securing said ring binder to said base member, said at least one securing fastener including,*

*an engagement portion in direct engagement with the upper structure for attaching said securing fastener to said upper structure; and*

*a plurality of securing elements for securing said ring binder to the base member, at least 75% of said elements extending away from a longitudinal axis of the engagement portion,*

*said securing fastener being free from any intervening sleeve member between the fastener and the upper structure.*

* * * * *